No. 770,435. Patented September 20, 1904.

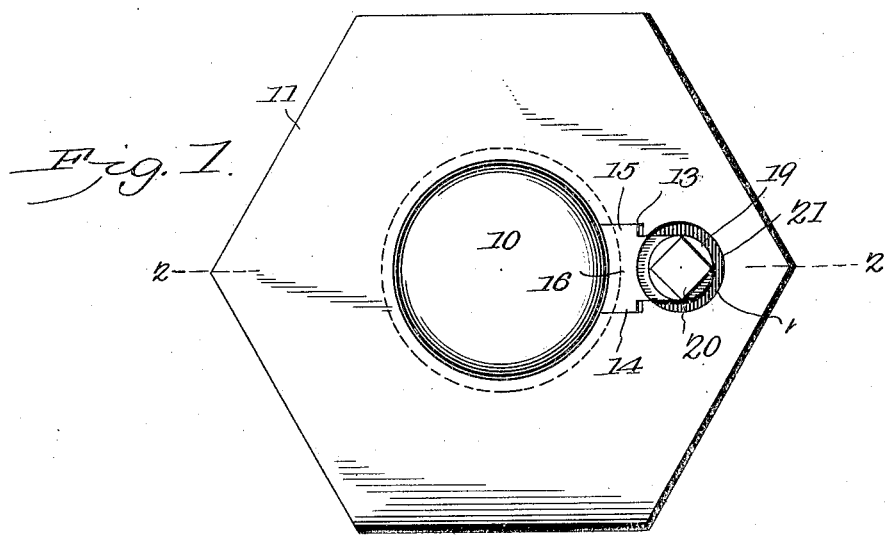
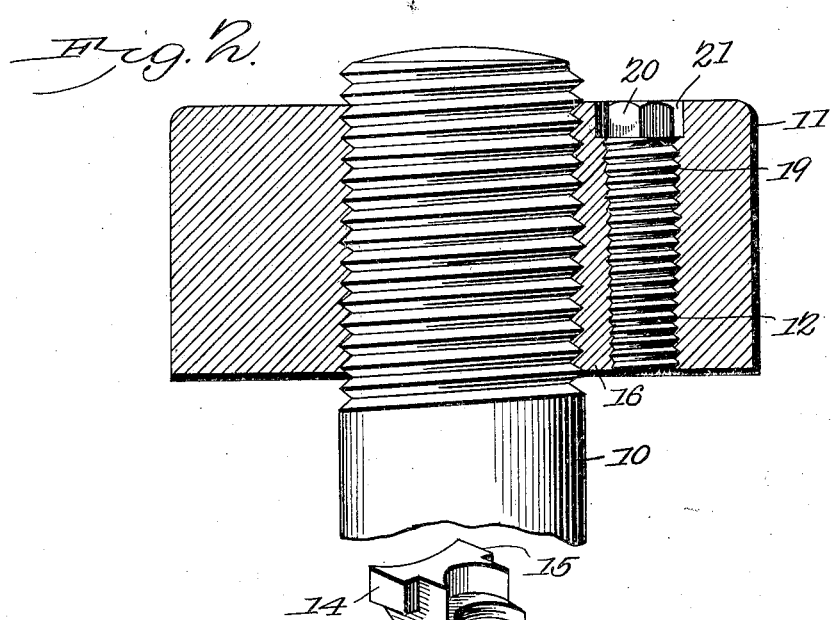
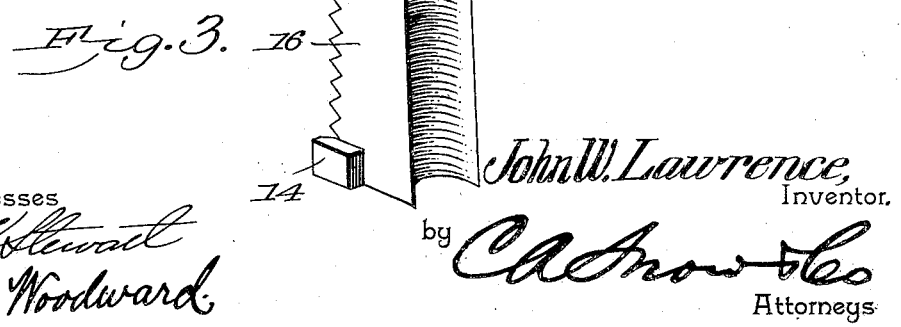

UNITED STATES PATENT OFFICE.

JOHN W. LAWRENCE, OF NORTH TONAWANDA, NEW YORK.

NUT-LOCK.

SPECIFICATION forming part of Letters Patent No. 770,435, dated September 20, 1904.

Application filed April 20, 1904. Serial No. 204,094. (No model.)

*To all whom it may concern:*

Be it known that I, JOHN W. LAWRENCE, a citizen of the United States, residing at North Tonawanda, in the county of Niagara and State of New York, have invented a new and useful Nut-Lock, of which the following is a specification.

This invention relates to lock-nuts, and has for its object to improve the construction and produce a device of this character which may be inexpensively manufactured and applied to any size of bolt or form of nut and which will not weaken or deteriorate the bolt.

Another object of this invention is to produce a lock for nuts which may readily be released and reattached as often as required without injury to the bolt or nut or to the locking attachment.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a plan view. Fig. 2 is a transverse section on the line 2 2 of Fig. 1. Fig. 3 is a perspective view of the locking-block detached.

In the improved device the bolt 10 and nut 11 are of the ordinary form, and in the improved device herein shown no change whatever is made in the bolt, as all the changes are in the nut, and these changes consist in a tapered aperture 12, formed longitudinally through the nut and spaced from the threaded aperture of the same. The tapered aperture 12 is internally threaded with a correspondingly-tapered thread and communicates with the threaded aperture of the nut by a radial recess 13. At its ends the recess 13 is provided with cavities sunken into the outer faces of the nut to receive ribs 14 15 on a plug 16, the plug slidably engaging the recess 13 and threaded on one side to conform to the threads of the bolt 10 and nut 11 and inclined on the outside and threaded to conform to the threads of the aperture 12.

A tapered threaded clamp-bolt 19 is provided for the tapered threaded aperture 12 and the adjacent portion of the plug 16 and provided with a rectangular head 20 for receiving a wrench, the head preferably sunken in the face of the nut and surrounded by an annular recess 21 to enable a key-wrench to be employed for operating the bolt. By this simple arrangement it will be obvious that when the clamp-bolt 19 is rotated in one direction the plug 16 will be very forcibly moved inward against the threads of the bolt and firmly clamp the nut thereto and effectually prevent any reverse motion or loosening of the same under the jars and concussions incidental to the operations of machinery or other structures to which it is applied. At the same time it is also obvious that by reversing the bolt the tapered plug will be released and the nut can be removed or rotated in either direction, as may be required to remove it entirely or to tighten it still further.

A very important advantage resides in the fact that the plug 16 may be quickly released by loosening the bolt 19, thereby permitting of the nut being removed from the bolt 10 or set up thereon, and when the nut has been set to the desired position it can be again locked upon the bolt 10 by turning the locking-bolt 19 so as to feed the same into the tapered recess 12, whereby the nut may be released and locked without damage to the threads of the bolt or the nut. This is a very important advantage when employed upon many forms of machinery and other structures, as will be obvious.

If required, the nut may be slightly enlarged to compensate for the material being removed in forming the aperture 12 and recess 13; but generally this will not be required, as the recess and aperture will preferably be formed in one corner of the nut, where there is ample surplus material.

Having thus described the invention, what is claimed is—

1. In a nut-lock, the nut having a tapered threaded aperture spaced from the threaded interior of the nut and communicating therewith by a radial recess, a tapered plug slidably disposed in said recess and threaded on one side to conform to the threads of the nut and threaded on the other side to conform to the threads of the tapered aperture, and a tapered threaded bolt for engaging said tapered aperture and the adjacent side of said plug.

2. In a nut-lock, the nut having a tapered threaded aperture spaced from the threaded interior of the nut and communicating therewith by a radial recess having lateral cavities at its ends depressed below the faces of the nut, a tapered plug slidably disposed in said recess and having lateral ribs at its ends for engaging said cavities said plug having threads on one side conforming to the threads of the nut and with threads on the other side conforming to the threads of the tapered aperture, and a tapered bolt threaded for engagement with said tapered aperture and the adjacent side of said plug.

In testimony that I claim the foregoing as my own I have hereto affixed my signature in the presence of two witnesses.

JOHN W. LAWRENCE.

Witnesses:
A. F. PREMUS,
MARY ANN LAWRENCE.